(12) United States Patent
Addleman et al.

(10) Patent No.: US 7,909,561 B2
(45) Date of Patent: Mar. 22, 2011

(54) TOW TRUCK WITH UNDERLIFT CONTROL

(75) Inventors: Jeffrey L. Addleman, Chambersburg, PA (US); Bradley S. Kresge, Hagerstown, MD (US)

(73) Assignee: Jerr-Dan Corporation, Greencastle, PA (US)

( * ) Notice: Subject to any disclaimer, the term of this patent is extended or adjusted under 35 U.S.C. 154(b) by 766 days.

(21) Appl. No.: 11/801,999

(22) Filed: May 11, 2007

(65) Prior Publication Data
US 2008/0279667 A1 Nov. 13, 2008

(51) Int. Cl.
*B60P 3/06* (2006.01)
(52) U.S. Cl. .......................................... 414/563; 701/36
(58) Field of Classification Search .................. 414/563; 701/36
See application file for complete search history.

(56) References Cited

U.S. PATENT DOCUMENTS

| | | | |
|---|---|---|---|
| 3,726,428 A * | 4/1973 | Lark et al. | 414/700 |
| 4,473,334 A | 9/1984 | Brown | |
| 4,741,661 A | 5/1988 | Carey | |
| 4,875,269 A * | 10/1989 | Crist | 29/401.1 |
| 5,782,596 A * | 7/1998 | Young et al. | 414/563 |
| 2002/0192063 A1 | 12/2002 | Fluke | |
| 2004/0136821 A1 * | 7/2004 | Berger et al. | 414/699 |
| 2004/0156706 A1 * | 8/2004 | Weller et al. | 414/563 |
| 2006/0104786 A1 * | 5/2006 | Shepherd et al. | 414/699 |
| 2008/0019815 A1 * | 1/2008 | Harris et al. | 414/563 |

FOREIGN PATENT DOCUMENTS

| | | |
|---|---|---|
| WO | WO 98/05529 | 2/1998 |
| WO | WO 2005/051832 | 6/2005 |

OTHER PUBLICATIONS

International Search Report and Written Opinion for PCT/US2008/063300 mailed Aug. 25, 2008.

* cited by examiner

*Primary Examiner* — Khoi Tran
*Assistant Examiner* — Rodney King
(74) *Attorney, Agent, or Firm* — Foley & Lardner LLP

(57) ABSTRACT

A vehicle includes a chassis and an underlift supported by the chassis. The underlift includes a boom including a vehicle engaging device coupled to the boom and a movement actuator for moving the boom. The underlift further includes a control system configured to restrict actuation of the movement actuator when the boom moves to a predetermined position; and an operator control coupled to the control system that allows the operator to control the movement actuator after actuation of the movement actuator has been restricted.

20 Claims, 13 Drawing Sheets

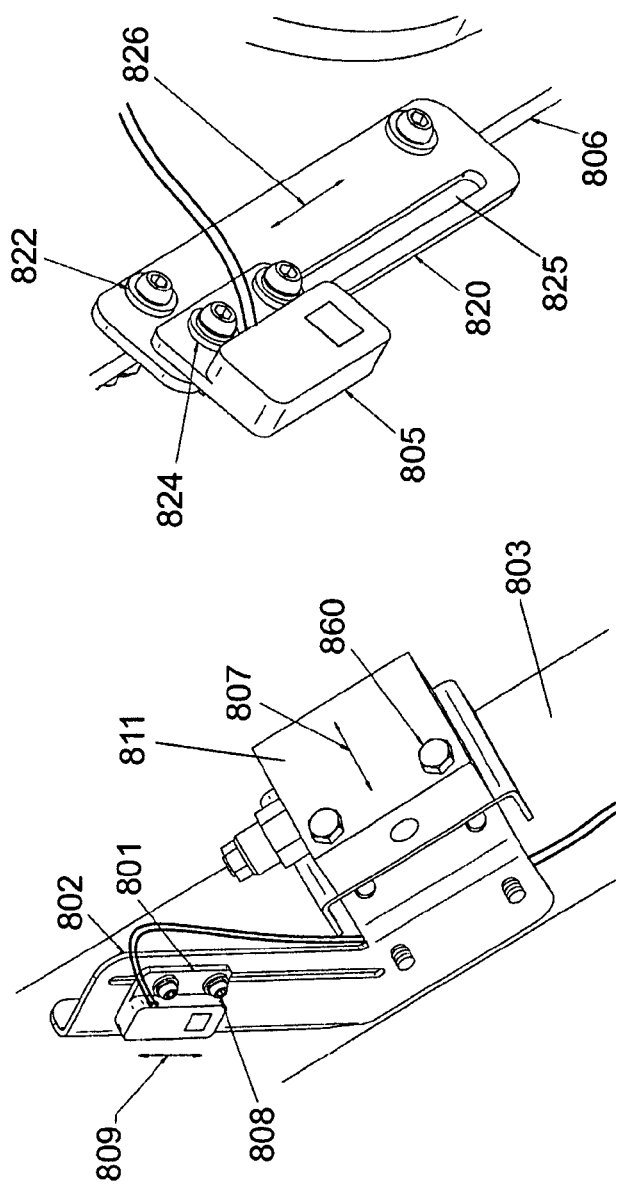
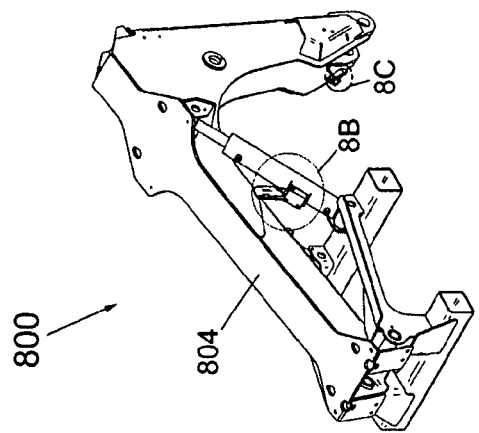
FIG. 8C
FIG. 8B
FIG. 8A

FIG. 10A
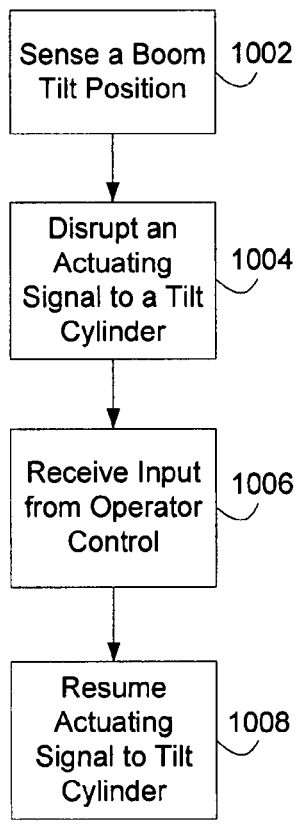
FIG. 10B
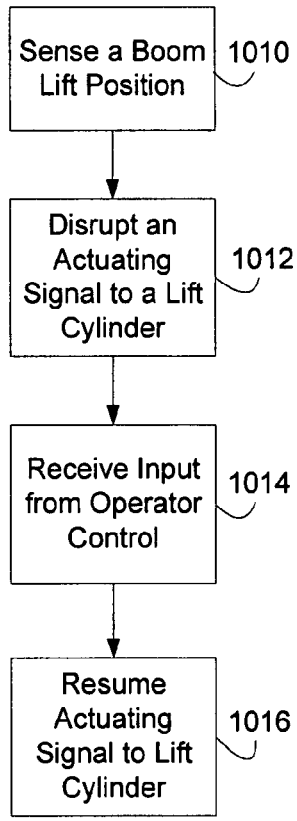
FIG. 10C
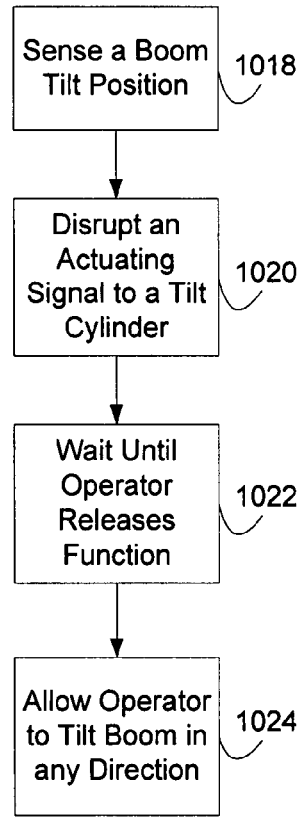
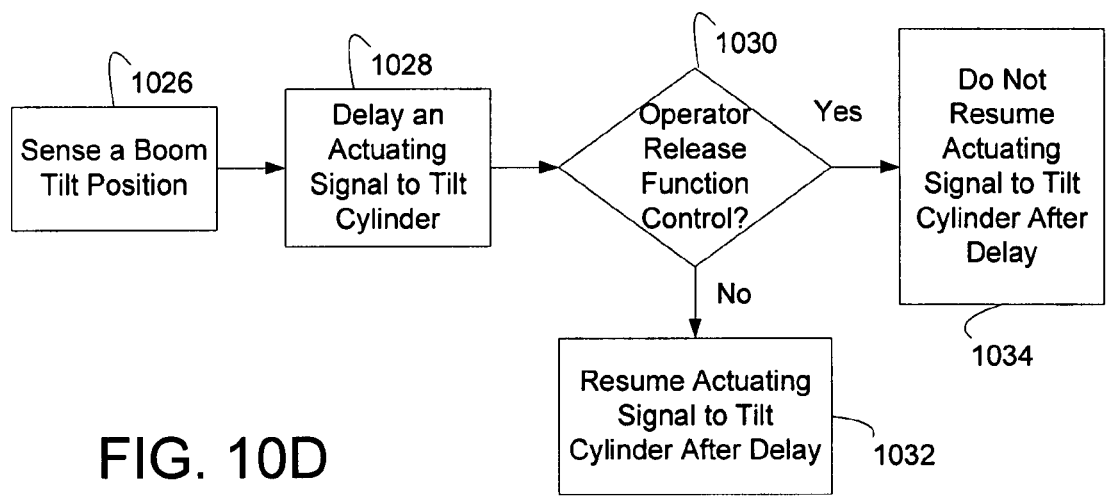
FIG. 10D

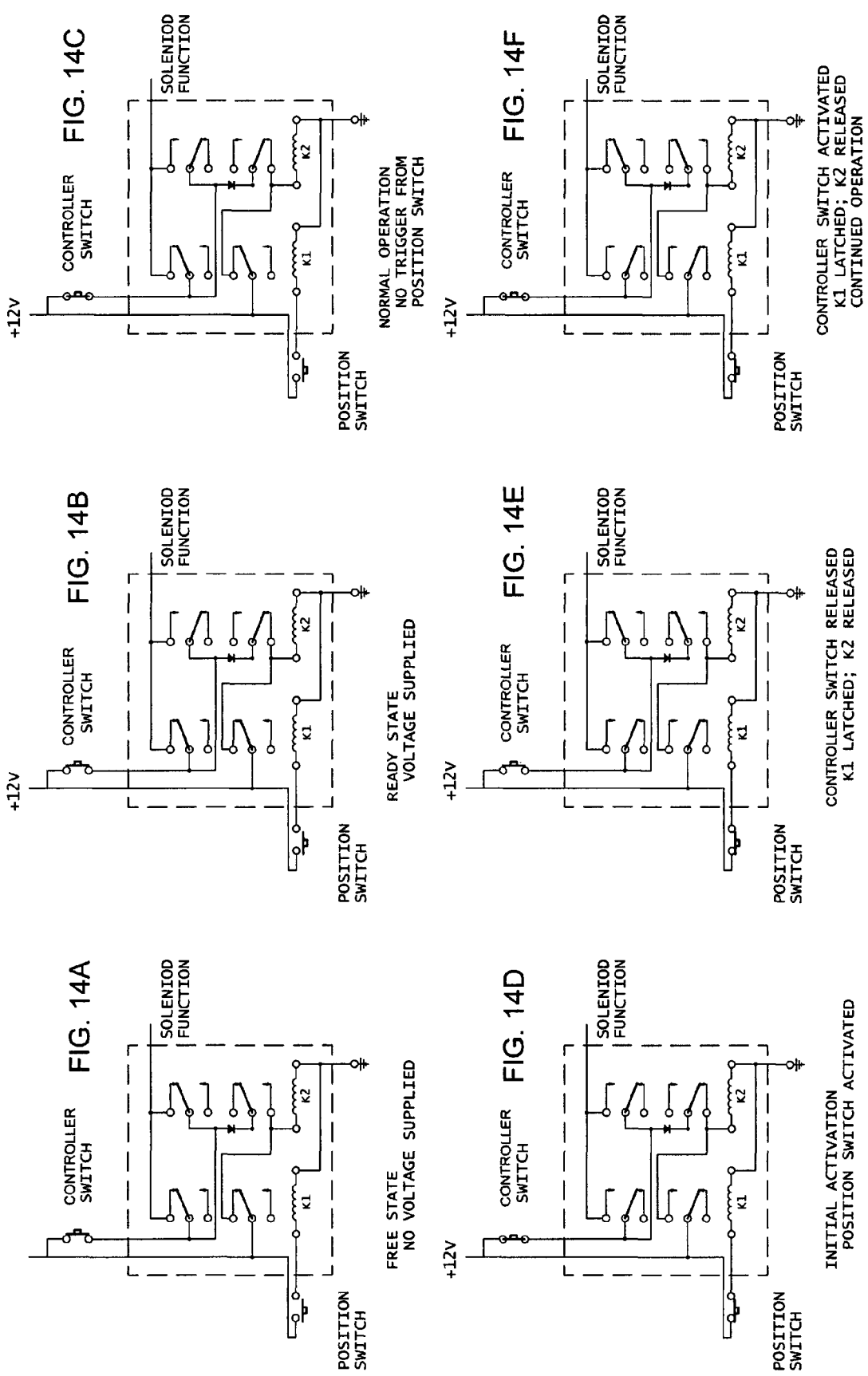

TOW TRUCK WITH UNDERLIFT CONTROL

BACKGROUND OF THE INVENTION

The present invention relates generally to the field of tow trucks and more particularly to tow trucks equipped with underlift control systems and methods for use with the same.

Tow trucks have long been used to move other vehicles from one location to another. Tow trucks are most often used when the vehicle being moved has been damaged or disabled such that the vehicle may not move using its own driving or moving components. Tow trucks may be used for other purposes, such as repossession purposes. One category of modern tow truck is a "wheel-lift" tow truck category. Wheel-lift tow trucks operate to tow disabled vehicles by lifting either the front or rear wheels off the ground and towing the partially lifted vehicle on its non-lifted wheels.

The lifting of a pair of wheels is often accomplished using an underlift. An underlift is a system of components configured to engage an underside of a target vehicle's wheels and to lift the end of the vehicle off the ground once engaged. Typical underlift systems include a support arm or lift arm and a boom having vehicle engaging attachments attached to a distal end of the boom extending away from the support arm. To engage a vehicle, an underlift system is usually lowered to a loading position. The loading position is typically a position where the support arm and boom are lowered to the ground such that the boom is close and parallel to the ground. The loading position is also usually a position that has been found to reduce the chance that of damaging the vehicle to be lifted. Once the loading position has been reached, the operator will then engage the vehicle, by, for example, reversing or moving the truck so that the boom with vehicle engaging mechanism is pushed under the car. Other trucks may engage the vehicle in different ways. For example, some trucks may use a winch or other mechanism to pull the vehicle onto the vehicle engaging attachments of the boom. A truck operator may then use lift controls to lift and/or tilt the distal end of the boom up at some angle and to lift and/or tilt the entire underlift structure (i.e., support arm, boom, vehicle engaging mechanism, etc.) up and away from the ground. A tow truck operator thereby engages and lifts structures of a target vehicle off the ground for towing.

While some vehicles are disabled in convenient locations for wheel engagement and lifting, other vehicles are disabled along uneven land or land that is angled downward. For example, if a vehicle is disabled in a ditch or in a driveway having a negative grade, it may be difficult to load the vehicle onto the boom as the boom may extend along a plane parallel to the frame of the tow truck and the distal end of the boom having the wheel engaging mechanism may be higher off the ground than may be desirable. To account for varying ground grades or situations, some modern underlifts have negative tilt capabilities. For example, tow truck models "MPL" and "MPL-40" sold by JERR-DAN CORP. include negative tilt booms. Negative tilt features allow a tow truck operator to position the underlift boom in the optimum position (i.e., level and close to the ground even during negative ground grade situations) for vehicle engagement.

While negative tilt features have certain advantages, the Applicants have discovered that negative tilt features also present certain difficulties or challenges. For example, Applicants have found that underlifts having negative tilt features are more susceptible to underlift mechanism damage. This damage can range from excessive dent and scratch damage that decreases the life-span of underlift components and/or may introduce rust to more serious damage such as the deformation of moving or actuating parts. Negative tilt or lift features may also damage driveway or roadway features and surfaces if the boom is improperly positioned.

What is needed is a vehicle, system and/or method that satisfies one or more of these needs or provides other advantageous features, such as, for example, ease-of-use features. Other features and advantages will be made apparent from the present specification. The teachings disclosed extend to those embodiments that fall within the scope of the claims, regardless of whether they accomplish one or more of the aforementioned needs.

SUMMARY OF THE INVENTION

One embodiment relates to a vehicle includes a chassis and an underlift supported by the chassis. The underlift includes a boom including a vehicle engaging device coupled to the boom and a movement actuator for moving the boom. The underlift further includes a control system configured to restrict actuation of the movement actuator when the boom moves to a predetermined position; and an operator control coupled to the control system that allows the operator to control the movement actuator after actuation of the movement actuator has been restricted.

Another embodiment relates to a method for controlling the movement of a vehicle underlift boom. The method includes causing underlift boom movement in response to an actuating signal from an operator control. The method further includes generating a position signal. The method yet further includes inhibiting underlift boom movement based upon the position signal and resuming underlift boom movement in response to input from the operator control.

Another embodiment relates to a vehicle underlift supportable by a vehicle chassis. The underlift includes a vehicle engaging device and a movement actuator for moving the vehicle engaging device. The underlift further includes a control system configured to restrict actuation of the movement actuator when the vehicle engaging device moves to a predetermined position. The underlift further includes an operator control coupled to the control system that allows the operator to selectively actuate the movement actuator after actuation of the movement actuator has been restricted.

Another embodiment relates to an underlift control circuit for controlling at least one underlift movement actuator, the control circuit including an operator interface configured to apply a control signal to the control circuit. The underlift control circuit further includes an underlift position sensor configured to apply a position signal to the control circuit. The control circuit is further configured to operate at least one underlift movement actuator in response to the control signal until the position signal changes in a predetermined way, operation of the underlift movement actuator being inhibited until there is a change in the control signal.

Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which:

FIG. 8A is a cutaway perspective view of an underlift system having a retrofit position sensor system that may be used for negative tilt and lift control, according to another exemplary embodiment;

FIG. 8B is a cutaway perspective view of a lift position sensor installed onto the underlift system of FIG. 8A, according to an exemplary embodiment;

FIG. 8C is a cutaway perspective view of a tilt position sensor installed onto the underlift system of FIG. 8A, according to an exemplary embodiment;

FIG. 10A is a flow chart of operation for underlift control system tilt control circuit, according to an exemplary embodiment;

FIG. 10B is a flow chart of operation for an underlift control system lift control circuit, according to an exemplary embodiment;

FIG. 10C is a flow chart of operation for an underlift control system tilt control circuit, according to another exemplary embodiment;

FIG. 10D is a flow chart of operation for an underlift control system tilt control circuit, according to another exemplary embodiment;

FIG. 14A-14F display various states of operation of an exemplary underlift control circuit, according to an alternative embodiment.

DETAILED DESCRIPTION OF THE PREFERRED EMBODIMENTS

Figure 1:
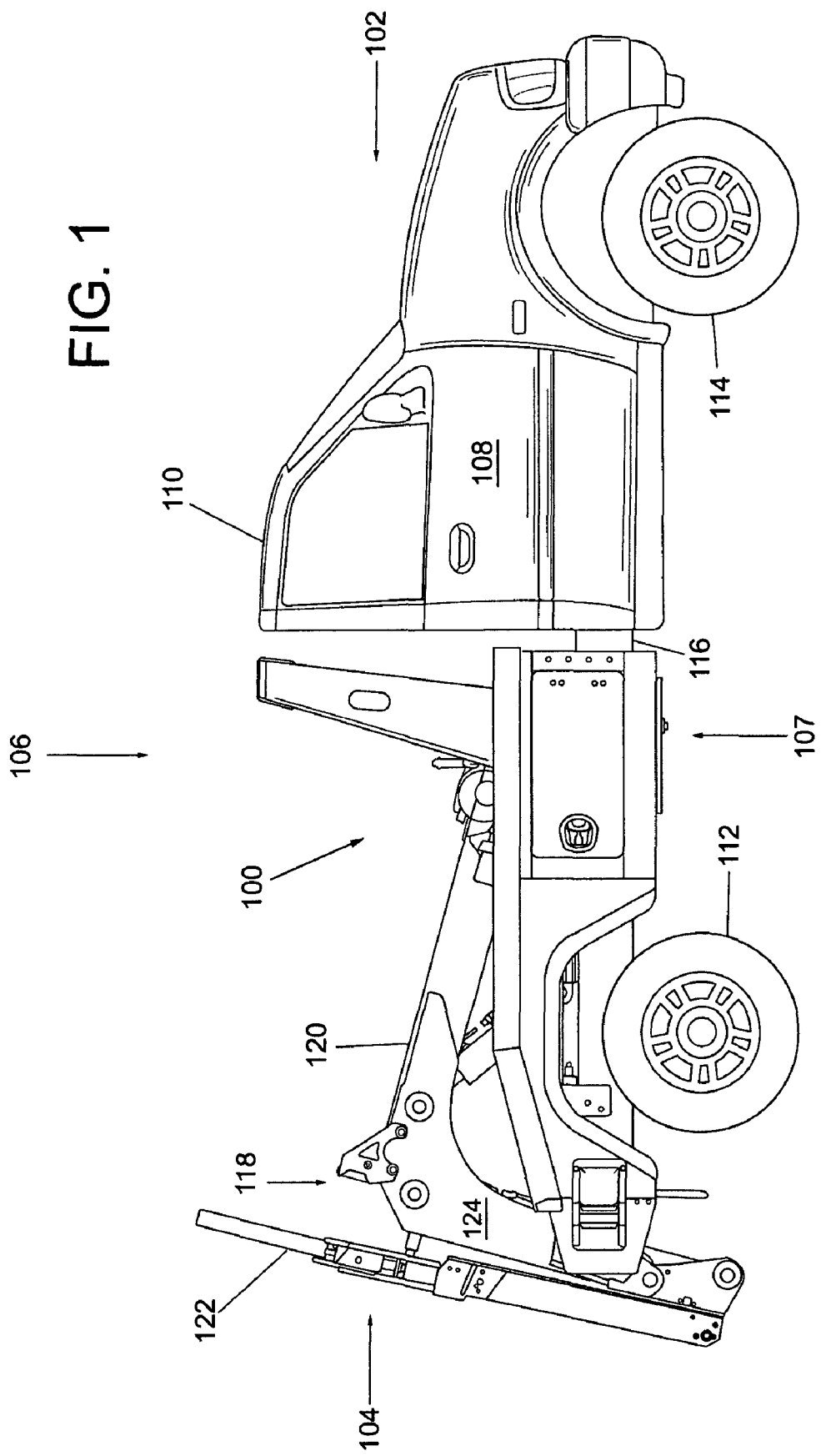
FIG. 1 is a side elevation view of a vehicle shown as a tow truck having an underlift system in a stored position, according to an exemplary embodiment.

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Referring generally to the figures, a vehicle is shown according to various exemplary embodiments. The vehicle is a tow truck and the tow truck particularly shown is known as a "wheel lift" tow truck which is configured to tow or move a target vehicle (e.g., a disabled vehicle) by lifting a set of the target vehicle's wheels (or other vehicle structure) off the ground and towing the partially-lifted target vehicle on a remaining set of wheels. The tow truck includes an underlift system or wheel lift mechanism configured to engage and lift the target vehicle's wheels. Lift and tilt features of the underlift mechanism are controlled by operator controls and an underlift control system. The operator controls and underlift control system allows a tow truck operator to variably control the height and tilt of a wheel-engaging boom of the underlift mechanism. Negative boom tilt and negative boom height adjustment are possible using the underlift mechanism and user control system. The underlift mechanism is uniquely configured to pause or stop the movement of the boom prior to allowing a truck operator to continue moving the boom to either a negative tilt or negative height position. Various embodiments further described herein are configured to facilitate this or other features.

Before discussing the details of the tow truck, systems and methods of the various exemplary embodiments, it should be noted at the outset that references to "front," "back," "rear," "upper," "lower," "right," and "left" in this description are merely used to identify the various elements as they are oriented in the FIGURES, with "front," "back," and "rear" being relative to the direction of travel of the vehicle. These terms are not meant to limit the element which they describe, as the various elements may be oriented differently in various applications.

It should further be noted that for purposes of this disclosure, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Referring to FIG. 1, tow truck 100 is a self-propelled vehicle having a front 102, a rear 104, a top 106, a bottom 107, and a pair of opposite sides, including a driver side or left side (not shown) and a right side 108. Tow truck 100 is further shown as including a cab 110, motive members 112 and 114, and a chassis or frame 116. Truck 100 also includes an underlift system 118.

Referring still to FIG. 1, chassis 116 supports the functional components of truck 100 including, but not limited to, front and rear motive members 112 and 114. Front and rear motive members 112 and 114 generally comprise ground motive members configured to propel or move truck 100. According to the embodiment illustrated, motive members 112 and 114 are wheels coupled to axles. According to various alternative embodiments, motive members 112 and 114 may comprise any other suitable mechanism for engaging a ground, track, or other surface so as to propel or suspend vehicle 100. For example, motive members 112 and 114 may comprise movable tracks. Additionally, truck 100 may be an all-wheel drive vehicle designed to provide driving power to all motive members or axles of the truck. Truck 100 may have off-road capabilities and may be further designed for airport rescue services. According to various exemplary embodiments, truck 100 may be any vehicle having an underlift system. Some vehicles having underlift systems may include firefighting vehicles, carriers, moving trucks, roll back carriers, side loading carriers, and/or a wide variety of other vehicles. The size and weight of the vehicle may be optimized for commercial use and/or military use.

Frame (i.e., chassis) 116 generally comprises one or more structures (e.g., beams, frame components, etc.) configured to serve as the base or foundation (i.e., support structure) for the remaining components of truck 100. Frame 116 generally extends in a fore and aft direction an entire length of truck 100 along a longitudinal center line of truck 100. According to various alternative embodiments, frame 116 may have any of a variety of suitable configurations for supporting components of truck 100.

Cab 110 is supported by frame 116 and functions as an operator or occupant compartment for truck 100. One or more access openings (e.g., doors, etc.) are provided in either, or both, of the left side or right side of truck 100 to provide a means for ingress and egress. Cab 110 includes controls associated with the manipulation of vehicle 100 (e.g., steering controls, throttle controls, etc.) and may optionally include controls or control systems associated with one or more auxiliary components of truck 100 (e.g., underlift components, winch components, hazard lights, etc.). Any number of the controls or control systems may also have wired or wireless remote control features.

Truck rear 104 includes an underlift system 118 securably attached to various truck structures (e.g., supported by chassis/frame 116, etc). Underlift system 118 is shown in FIG. 1 as folded or positioned in a stored position. In this stored position, lifting arm 120 is raised and boom 122 is folded against support arm 124.

Figure 2:
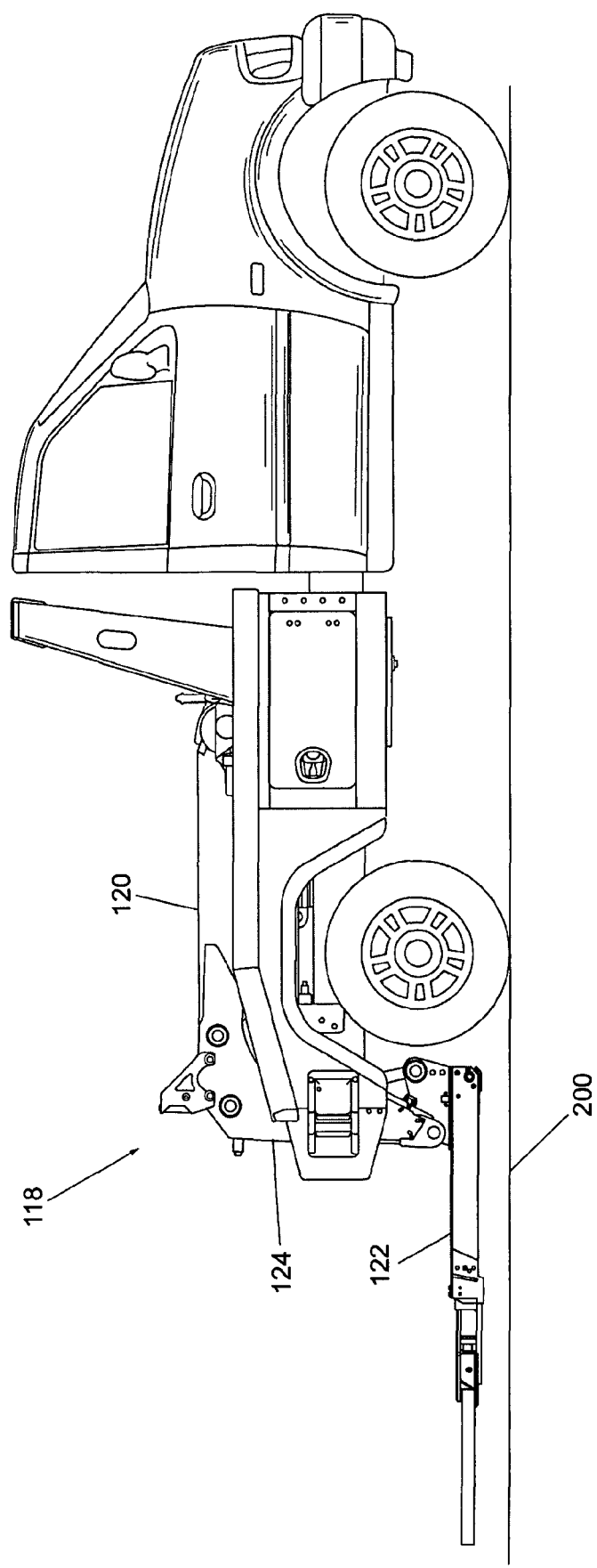
FIG. 2 is a side elevation view of a tow truck having an underlift system in a default loading position, according to an exemplary embodiment.

Referring to FIG. 2, truck 100 is shown with underlift system 118 being in a loading or ground parallel position. Lifting arm 120 is shown as lowered and boom 122 is angled or folded away from support arm 124. In the loading position shown in FIG. 2, boom 122 is shown as having some clearance off ground 200 and is substantially parallel to frame 116. According to various other exemplary embodiments, and/or operator preference, a default loading position may be any predetermined loading position where the boom is not in contact with the ground but is positioned to receive wheels or some other structure of a target vehicle. When truck 100 is operating on relatively flat ground, this default loading position will hold boom 122 substantially parallel to ground 200 (i.e., more than half of boom 122 is substantially parallel to ground 200). If the ground is not flat, the default loading position shown in FIG. 2 may hold the loading end (e.g., rear end) of boom 122 too high above the ground for convenient or possible loading of vehicle wheels onto wheel engaging structures of boom 122. In many real-world towing situations the ground is not flat and tow truck 100 is often located on ground that is negatively graded (e.g., sloping down and away from the rear of truck 100).

Figure 3:
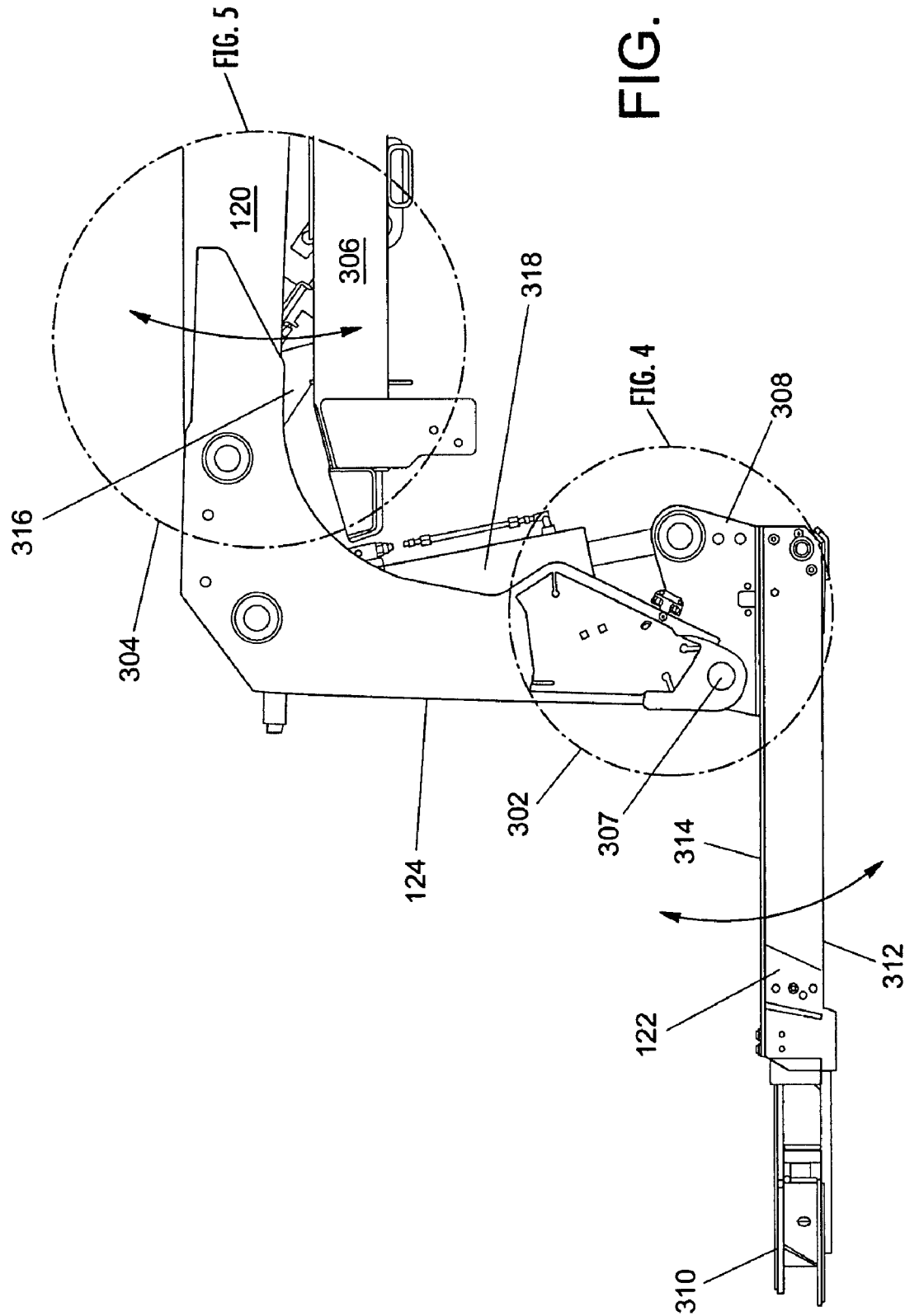
FIG. 3 is a side elevation view of an underlift system, according to an exemplary embodiment.

Referring to FIG. 3, a partial side view of underlift system 118 is shown, according to an exemplary embodiment. Underlift system 118 includes tilt portion 302 and a lift portion 304. Tilt portion 302 generally angles boom 122 around pivot 307 relative to support arm 124. Lift portion 304 generally raises or lowers lifting arm 120 away from or near to truck platform 306. Boom 122 includes a boom base 308, a distal end 310, a lower edge 312 and an upper edge 314. To position boom 122 for engaging the wheels of a vehicle, tilt portion 302 and lift portion 304 generally move the boom in a downward direction.

Figure 4:
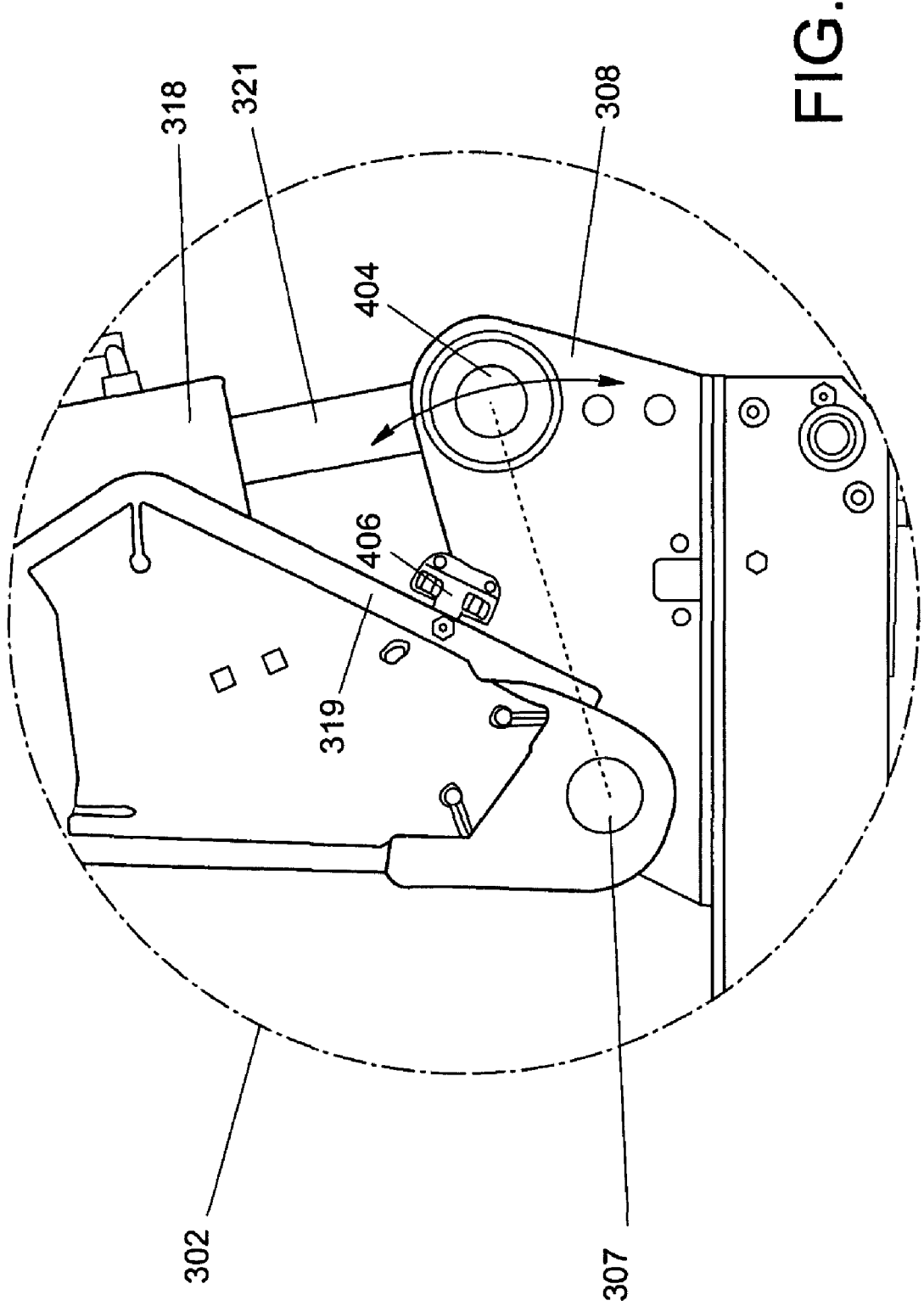
FIG. 4 is a detailed side elevation view of area 302 of FIG. 3, according to an exemplary embodiment.

Tilt portion 302, shown in FIG. 3 and in detail in FIG. 4, includes a tilt cylinder 318 having one end coupled to boom base 308 at pivot 404 and the opposite end coupled to support arm 124. When tilt cylinder 318 is actuated so that cylinder 318 extends, the structure of boom base 308 near pivot 404 is pushed downward and the boom base structures near pivot 307 rotate around pivot 307 so that boom 122 tilts upward (i.e., distal end 310 angularly raises relative to boom base 308). When tilt cylinder 318 is actuated so that cylinder 318 retracts, piston rod 321 pulls boom base 308 upward and the boom distal end 310 having a vehicle engaging structure is rotated downward.

Tilt portion 302 also includes tilt position sensor 406. Tilt position sensor 406 is attached to support arm knee 319. Tilt position sensor 406 may alternatively be attached to other structures of boom base 308, tilt cylinder 318, support arm 124, and/or attached or located at any other position where it may accurately sense various tilt positions of boom 122. Tilt position sensor 406 (and the various lift position sensors shown in other figures) may be any type of sensor suitable for detecting tilt positions or positions of structures that indicate tilt. Tilt position sensor 406 may be, for example, an optical sensor, a capacitive sensor, a physical switch, a magnetic sensor, and/or any other type of sensor or switch of the past, present, or future suitable for detecting and communicating position or tilt state indication.

Tilt cylinder 318 (and the other lift and tilt cylinders shown throughout this application) may generally refer to any mechanical actuator that is capable of providing a moving force to the structural elements of the tow truck. According to an exemplary embodiment, the cylinders are hydraulic cylinders (i.e., linear hydraulic motors) and are used to give a linear force through a linear stroke via controlled hydraulic pressure. The cylinder will generally include a cylinder barrel in which a piston or piston rod moves.

Figure 5:
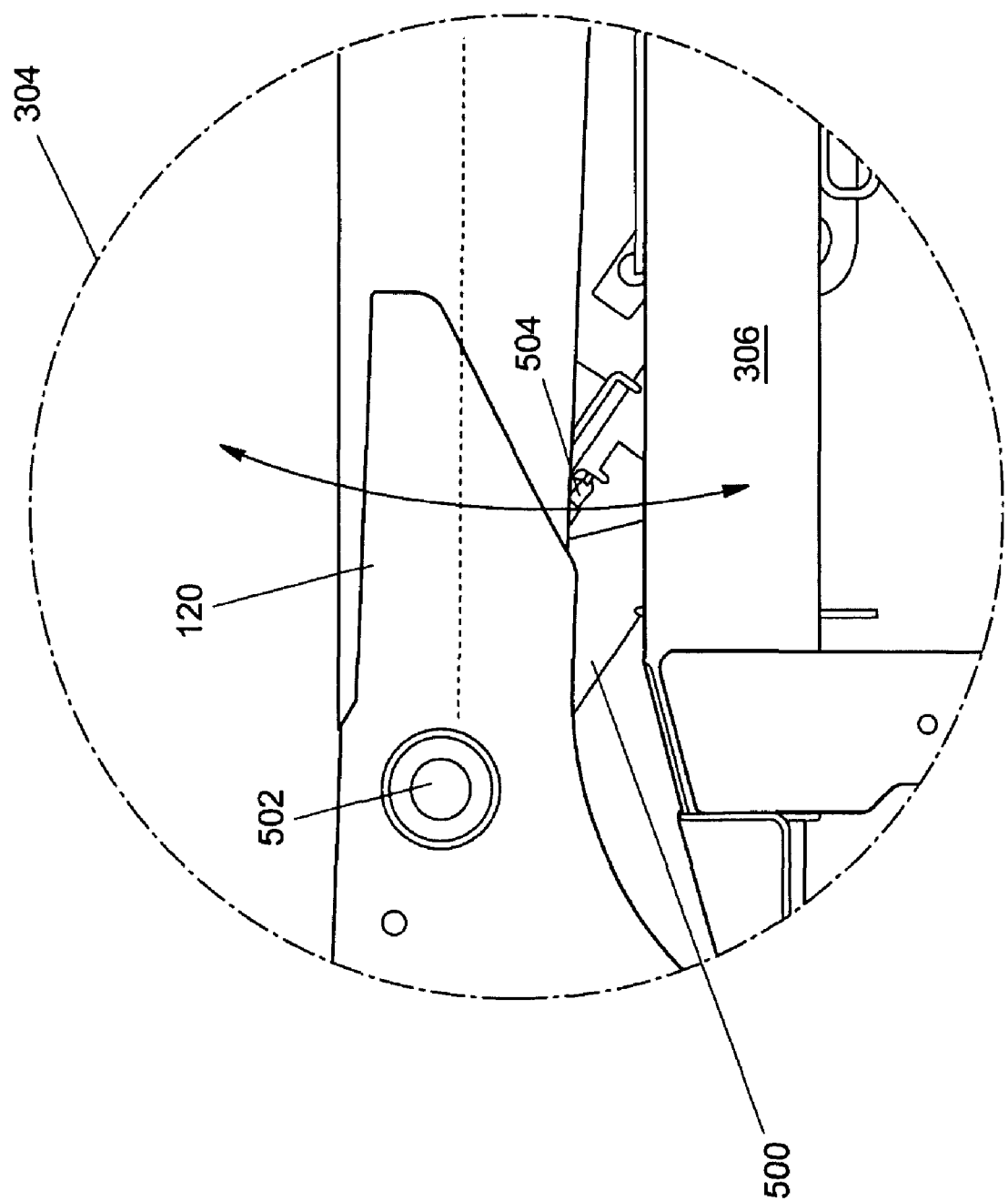
FIG. 5 is a detailed side elevation view of area 304 of FIG. 4, according to an exemplary embodiment.

Lift portion 304, shown in FIG. 3 and in detail in FIG. 5, includes a lift cylinder 500 having one end coupled to truck platform 306 and the other end coupled to lifting arm 120 at pivot 502. Lift cylinder 500 generally operates to raise or lift the lifting arm 120 up and away from truck platform 306 when extended. When contracted, lifting arm 120 moves downward and also causes the other structures of the underlift system, including boom 122 and any wheel engaging apparatus to move downward.

Lift portion 304 also includes lift position sensor 504. According to the exemplary embodiment shown in FIG. 5, sensor 504 is coupled to lift cylinder 500 and is configured to pulse or switch when portions of lifting arm 120 are detected.

Figure 6:
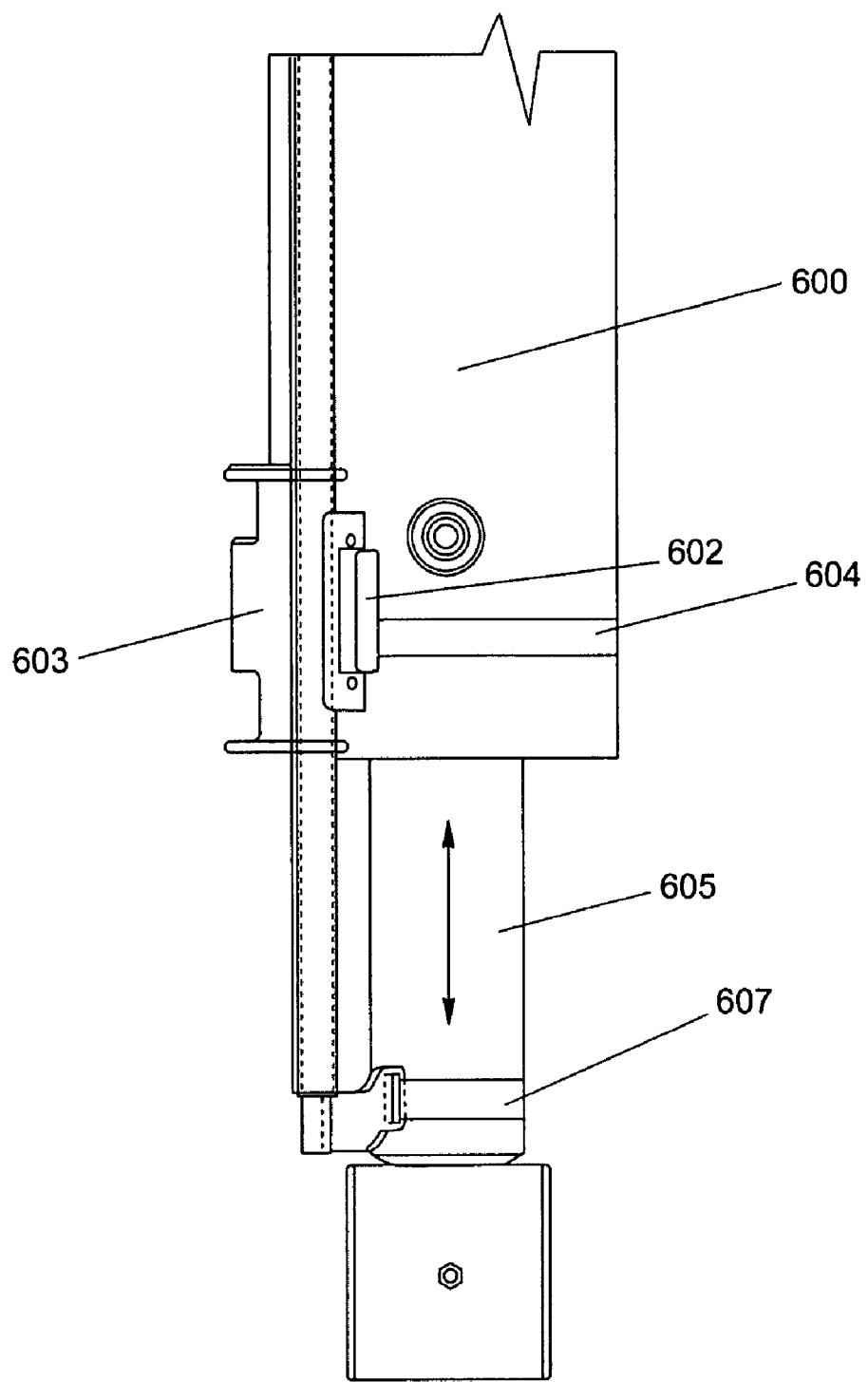
FIG. 6 is a detailed side elevation view of a lift or tilt cylinder having a sensing switch, according to another exemplary embodiment.

Referring to FIG. 6, a lift or tilt cylinder 600 is shown having a sensor 602 installed for sensing lift or tilt position, according to an alternative embodiment. In this embodiment, an adjustable position support guide bracket 603 is attached to cylinder 600 with band clamps 604 and 607. Sensor 602 is attached to adjustable position support guide bracket 603. Cylinder 600 has a non-magnetic outer tube and sensor 602 is a steel sensing switch. Sensor 602 operates by detecting the position of steel rod core 605. A variety of different mounting mechanisms may be used to secure a sensor to a lift or tilt cylinder to detect lift or tilt positions. This embodiment teaches that sensors may be used to detect cylinder position directly, not needing to rely on sensing a direct relationship between underlift structural parts or between underlift structure and cylinder.

Figure 7B:
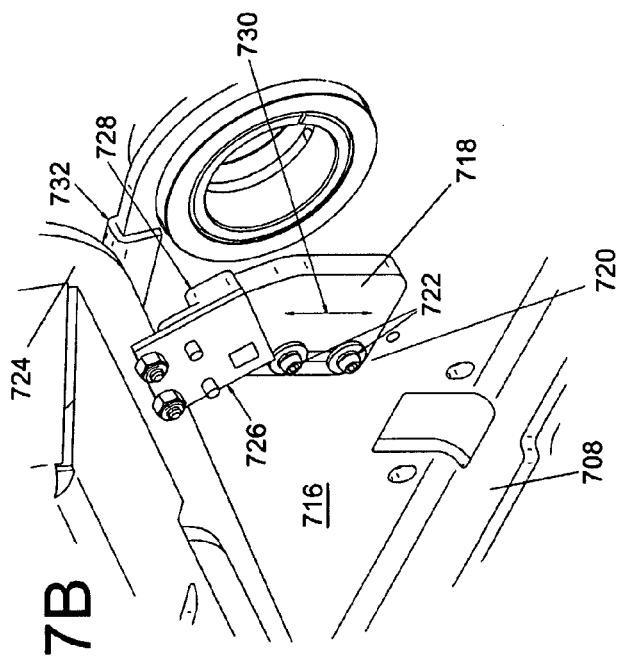
FIG. 7B is a cutaway perspective view of a tilt position sensor installed onto the underlift system of FIG. 7A, according to an exemplary embodiment.
Figure 7C:
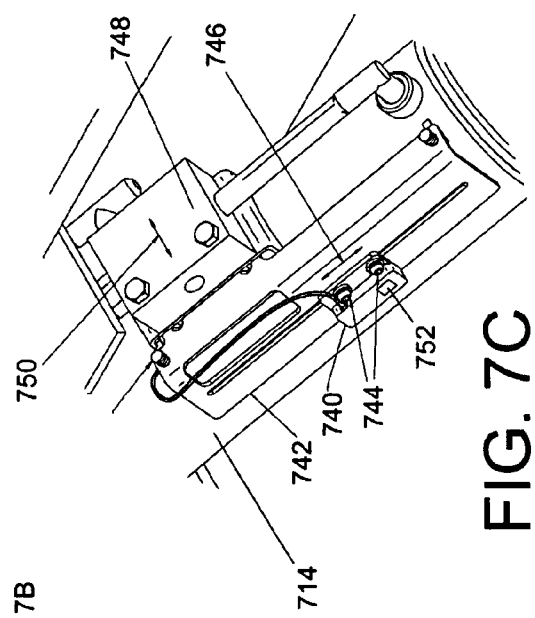
FIG. 7C is a cutaway perspective view of a lift position sensor installed onto the underlift system of FIG. 7A, according to an exemplary embodiment.
Figure 7A:
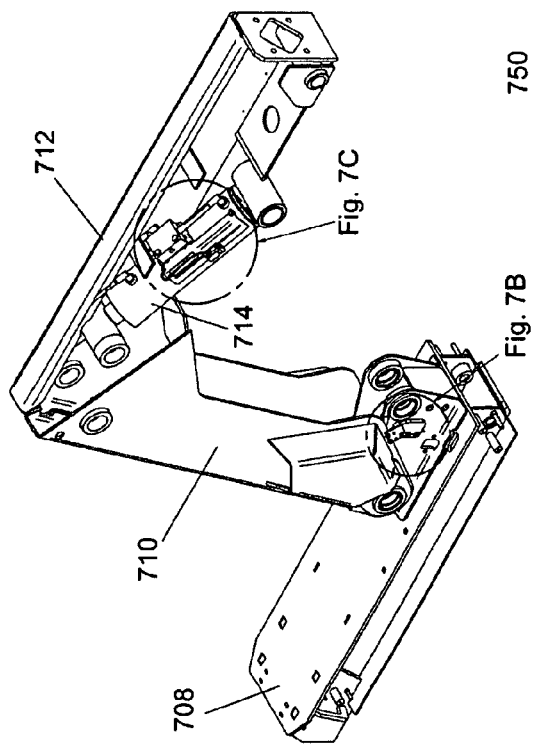
FIG. 7A is a cutaway perspective view of an underlift system having a retrofit position sensor system that may be used for negative tilt and lift control, according to an exemplary embodiment.

Referring generally to FIGS. 7A-7C, an underlift system 702 is shown having retrofit position sensors installed, according to various alternative embodiments. Underlift system 702 may be an underlift system from JERR-DAN Corporation's Wrecker model "MPL." FIG. 7A shows a partial cutaway perspective view of underlift system 702. FIG. 7A identifies areas 7B and 7C which are shown in greater detail in FIG. 7B and FIG. 7C. 7B is a close-up perspective view of how a tilt position sensor may be installed between boom 708 and support arm 710. 7C is a close-up perspective view of how a tilt position sensor may be installed on lift cylinder 714 to detect a structure of lifting arm 712.

Referring to FIG. 7B, boom base plate 716 is shown extending vertically from boom 708. Boom base plate 716 is fixed to boom 708 and moves with boom 708 when the boom is tilting. Flag block 718 is securably attached to boom base plate 716 at location 720 with bolts 722. A technician retrofitting underlift system 702 for use with position sensors would drill mounting holes in boom base plate 716 to receive bolts 722. According to various alternative embodiments, flag block 718 may be secured to boom base plate 716 differently (e.g., straps, adhesive, etc.). Flag block 718 serves as a known and easily detected structure for the position sensor to detect. According to various other embodiments, flag block 718 may be omitted or take a different form. The lower edge of support arm 710 may define support arm knee 724. A technician retrofitting underlift system 702 for use with position sensors would drill mounting holes in support arm knee 724 for securing mounting plate 726. Tilt position sensor 728 is then securably mounted to mounting plate 726. According to an exemplary embodiment, the mounting plate is aligned with the sensor region and the gap between the sensor and the flag is small enough so that intermittent operation of tilt position sensor 728 does not occur. Some amount of adjustment of the tilt position sensor relative to the flag block might be necessary to ensure that tilt position sensor is triggered or switched at the correct boom tilt position. While this may be accomplished in a variety of ways, in the exemplary embodiment shown in FIG. 7B, the flag block 718 may include a continuous mounting channel that allows for adjustment along adjustment axis 730. A technician retrofitting underlift 702 with position sensors may loosen bolts 722 to slide flag block 718 up and down and tighten bolts 722 when a desired flag block position is reached. Wires to sensor 728 may be routed along structures of support arm 710 and edge trim 732 may be installed on various structures that will be adjacent to the wires to protect the sensor wires.

Referring to FIG. 7C, lift position sensor 740 is shown mounted to the back side of mounting plate 742 via bolts 744. Lift position sensor 740 may be adjustably positioned along the length of lift cylinder 714 (axis 746) by sliding position sensor 740 and bolts 744 along channel 745 of mounting plate 742. Mounting plate 742 is attached to lift cylinder counterbalance bracket 748. Mounting plate position may be adjusted along axis 750 to increase or decrease the gap between the sensor face 752 and the side of lift arm 712 to be sensed. Wires from lift position sensor 740 may be run from the sensor to a control module. Final adjustments of tilt position flag block 718 and lift position sensor 740 may be made to achieve desired tilt and lift stop positions during operation.

Referring generally to FIGS. 8A-8C, an underlift system 800 is shown having retrofit position sensors installed, according to various alternative embodiments. Underlift system 800 may be an underlift system from JERR-DAN Corporation's Wrecker model "MPL40." FIG. 8A shows a partial cutaway perspective view of underlift system 800. FIG. 8A identifies areas 8B and 8C which are shown in greater detail in FIG. 8B and FIG. 8C. 8B is a close-up perspective view of how a lift position sensor may be installed on the underside of lift arm 804. 8C is a close-up perspective view of how a tilt position sensor 805 may be installed on knee boom edge 806.

Referring to FIG. 8B, mounting bracket 802 is installed lower on lift cylinder 803 than the mounting bracket shown in FIGS. 7A and 7C as underlift system 800 is a different design (underlift system 800 includes two lift cylinders 803 located on the exterior of lift arm 804). Mounting bracket 802 is installed to counterbalance valve mounting plate 811 via bolts 860. Lift position sensor 801 is attached to mounting bracket 802 with bolts 808. Lift position sensor 801 may be adjusted along axis 809 to achieve or configure a desired lift stopping position caused by sensing a structure of lift arm 804 with sensor 801. Mounting bracket 802 may be adjusted along axis 807 to adjust the spacing between lift position sensor 801 and structures of lift arm 804 to be sensed.

Referring to FIG. 8C, mounting bracket 820 is shown attached to knee boom edge 806 and secured with bolts 822. Tilt position sensor 805 is attached to mounting bracket 820 with bolts 824. Tilt position sensor 805 and bolts 824 are configured to be slidably adjusted along axis 826 by moving position sensor 805 along slot 825. A technician may adjust the sensor as necessary to achieve a desired tilt stop position of the underlift boom.

Figure 9:
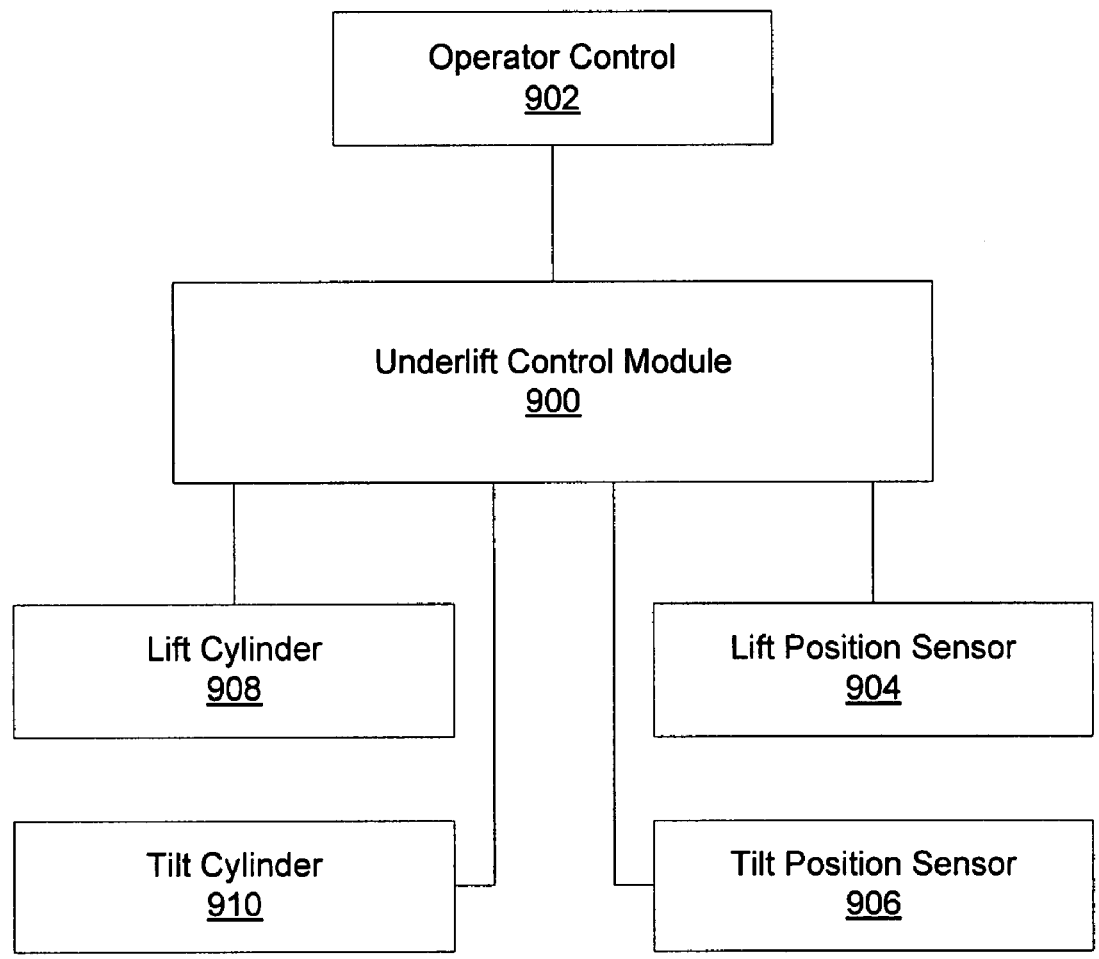
FIG. 9 is a block diagram of an underlift control module and operator control coupled to components of an underlift system, according to an exemplary embodiment.

Referring to FIG. 9, a block diagram of an underlift control module 900 is shown, according to an exemplary embodiment. Control module 900 is coupled to operator control 902. Operator control 902 may include any number of switches, buttons, joysticks, graphical user interfaces, touch screens, and/or other control devices of the past, present, or future configured to receive input from an operator and provide a control signal to control module 900. Control module 900 may be a variety of electrical circuits and/or processing components configured to provide various operative features disclosed in this application. Control module 900 may be, for example, a circuit having exclusively passive electric components or an active circuit having any number of active components, processors (field programmable gate arrays, etc.), and/or other logic components (e.g., digital and/or analog logic circuits and components, AND gates, NAND gates, OR gates, NOR gates, etc.).

Referring further to FIG. 9, control module 900 is coupled to receive inputs from lift position sensor 904 and tilt position sensor 906. The connection between lift and tilt sensors and underlift control module 900 may be made via a lift sensor interface and a tilt sensor interface (shown as lines interconnecting the control module to the sensors). The sensor interfaces may include a variety of receiving circuitry, filtering circuitry, hardware plugs, wires, and/or other components configured to facilitate the communicative coupling of sensors 904 and 906 to control module 900. Control module 900 is also connected to lift cylinder 908 and tilt cylinder 910. The connection between lift and tilt cylinders and underlift control module 900 may be made via a lift cylinder interface and a tilt cylinder interface (shown as lines interconnecting the control module to the sensors). The cylinder interfaces may include a variety of receiving circuitry, filtering circuitry, hardware plugs, wires, and/or other components configured to facilitate the communicative coupling of cylinders 908 and 910 to underlift control module 900. Underlift control module 900 may be a central control module or circuit. According to alternative exemplary embodiments, components of underlift control module may be dispersed and/or multiple underlift control modules may be provided. For example, the lift position sensor and lift control module may be integrated into a single circuit and/or housing and be installed at the sensor position.

Referring to FIG. 10A-10D, various exemplary methods for controlling an underlift system are shown. Referring first to FIG. 10A, a method for controlling an underlift boom tilt position is shown, according to an exemplary embodiment. A tow truck operator may command a boom to tilt to various tilt positions via operator controls. The operator controls may send a control signal or actuating signal (originating at the underlift control module or otherwise) to a tilt cylinder. One or more sensors or switches may be dispersed on the structures of the boom or adjacent structures (e.g., support arm, etc.). These sensors may be configured to detect various tilt positions, predetermined or otherwise, of the tow truck's underlift boom. According to an exemplary embodiment, a tilt sensor is configured to sense a predetermined boom tilt position (step 1002). The predetermined boom tilt position may be adjustable. A default predetermined boom tilt position may be provided where the position is such that an underside surface of the boom is parallel to the ground. Once the sensor has sensed that the predetermined boom position has been reached in step 1002, an indicating signal may be sent to the underlift control module. The control module may be configured to disrupt an actuating signal to the cylinder when the position indicating signal is received (step 1004). Once the signal is disrupted, the underlift control module may wait to receive further input from the operator controls. Once further input is received from the operator controls (step 1006), the underlift control module may resume sending an actuating signal to the tilt cylinder (step 1008).

Referring to FIG. 10B, a flow chart of a method for controlling an underlift boom lift position is shown, according to an exemplary embodiment. A lift sensor may sense a boom lift position (step 1010). When a predetermined lift position has been reached (e.g., the boom is determined to be close to the ground), an underlift controller may disrupt an actuating signal being sent to a lift cylinder (step 1012). The controller may wait to receive further input from an operator control. An operator control signal may be received at an interface between operator control hardware and the controller (step 1014). Once received, the controller may resume or restart sending an actuating signal to the lift cylinder (step 1016).

Referring to FIG. 10C, a flow chart of a method for controlling an underlift system is shown, according to an exemplary embodiment. A boom tilt position is sensed (step 1018) and an actuating signal to a tilt cylinder is disrupted (step 1020). The controller may then be configured to wait indefinitely until the operator releases the operator control. Once released, the controller may then allow the operator to tilt the boom in any direction. For example, the operator could continue to tilt the boom in a negative direction or may bump or otherwise move the boom in a positive direction to avoid scraping or nearing the ground with the boom distal end.

Referring to FIG. 10D, a flow chart of a method for controlling an underlift system is shown, according to another exemplary embodiment. A boom tilt position is sensed (step 1026) and an actuating signal to a tilt cylinder is delayed (step 1028). This delay may range from a slight delay (e.g., around 1 second) to a longer delay (e.g., 5 seconds) to allow for varying reaction times of truck operators. Control logic may then vary based on whether or not the operator has released the function control (step 1030). If the operator does not release the control function during the period of delay, the controller will resume the actuating signal to the tilt cylinder after the delay (step 1032). If the operator released the control function during the period of delay, the controller will not resume an actuating signal to the tilt cylinder after delay (step 1034). According to various exemplary embodiments, after step 1034 the operator would have to re-indicate a control operation in the negative direction, wait through the delay, and hold the control through the delay to allow the boom to tilt in a negative direction or past the sensed tilt position. According to other exemplary embodiments, after step 1034 the operator may indicate any direction, positive or negative, and the boom will tilt in that direction without repeating any steps of FIG. 10D.

Figure 11:
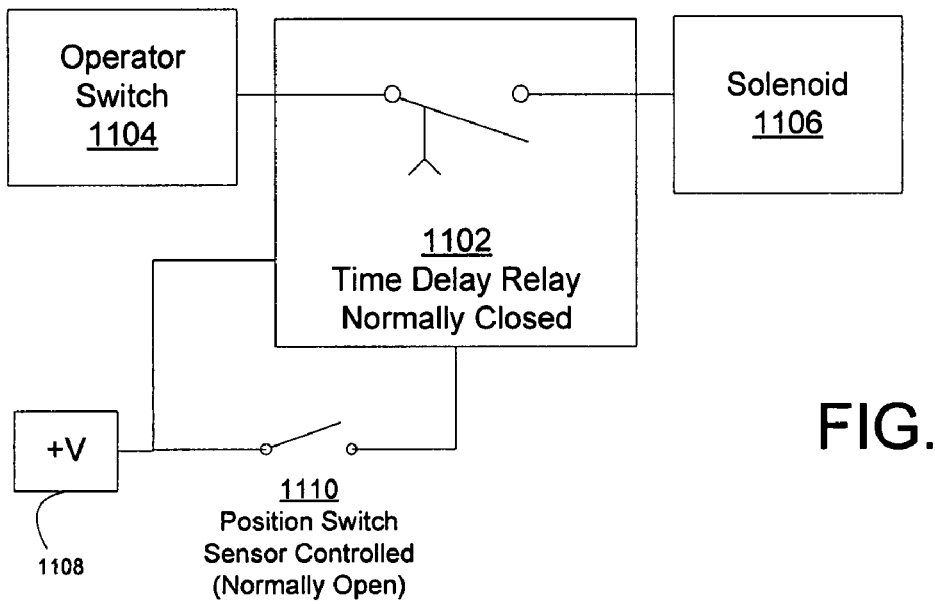
FIG. 11 is block diagram of an underlift control circuit, according to an exemplary embodiment.

Referring to FIG. 11, a block diagram of an exemplary underlift control circuit for possible use in tilt and/or lift control is shown, according to an exemplary embodiment. The control circuit includes a normally closed time delay relay 1102 disposed between an operator switch 1104 and a tilt or lift cylinder solenoid 1106. A voltage source 1108 is disposed to power the circuit. A position switch 1110 (e.g., position sensing switch, etc.) couples an output of the voltage source with an input of the normally closed relay. Position switch 1110 is normally open. When a predetermined tilt position is reached, position switch 1110 may close. The normally closed time delay relay 1102 may be configured to open, disrupting an actuating signal to solenoid 1106, for a period of time determined by the parameters of time delay relay 1102. If the operator maintains a negatively indicating operator switch position, once the time delay lapses, relay 1102 may again close and the actuating signal may be passed to solenoid 1106 so that the boom may continue to move to various negative tilt positions. If the operator releases the negatively indicating operator switch position during the delay of relay 1102, solenoid 1106 will not receive any further actuating signal until the operator resumes control via an operator switch.

Figure 12:
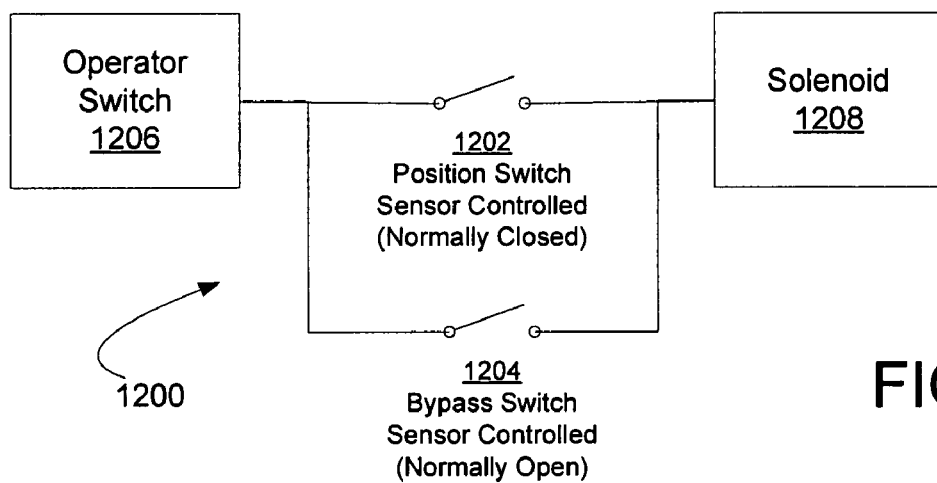
FIG. 12 is a block diagram of an underlift control circuit, according to an exemplary embodiment.

Referring to FIG. 12, a block diagram of another exemplary underlift control circuit 1200 is shown, according to an exemplary embodiment. Position switch 1202 and bypass switch 1204 are disposed between an output of operator switch 1206 and solenoid input 1208. Position switch 1202 is a sensor controlled normally closed switch. Once a predetermined negative tilt position is reached, position switch 1202 will open and an actuating circuit between operator switch 1206 and solenoid 1208 will be broken. The solenoid will not continue actuating the boom along a negative tilt angle. To resume actuating the boom along the negative tilt angle, the operator may use a normally open bypass switch 1204 to again close the circuit between the operator switch 1206 and the solenoid 1208. Additional circuit elements may be provided to reset the position switch if the operator indicates a positive tilt direction or after the bypass switch has been closed.

Figure 13:
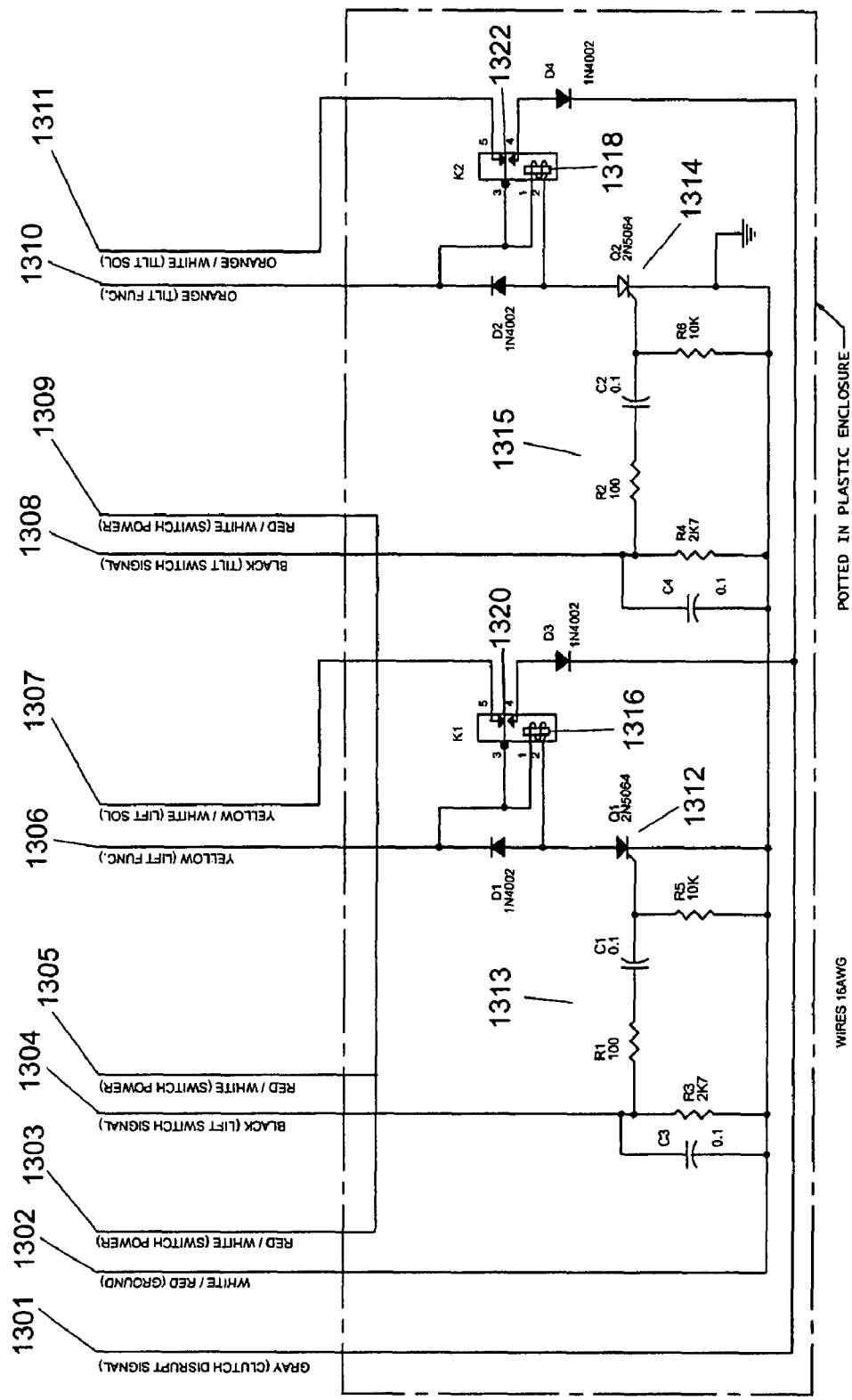
FIG. 13 is a simplified schematic of an underlift control circuit, according to an exemplary embodiment.

Referring to FIG. 13, a simplified schematic of another exemplary underlift control module 1300 is shown. Control module 1300 includes a variety of inputs and outputs. Line 1301 is a clutch disrupt output. 1303 is a switch power line. 1304 is a lift switch (i.e., sensor) input line. 1305 is a lift switch power line. 1306 is a lift control input line. 1307 is a lift cylinder output line. 1308 is a tilt switch (i.e., sensor) input line. 1309 is a switch power line. 1310 is a tilt control input line. 1311 is a tilt cylinder output line. Control module 1300 is configured to provide underlift control to both the tilt and lift cylinders. According to various exemplary embodiments, either feature may be separated and/or removed from the features of the tow truck.

Referring further to FIG. 13, exemplary operation of the circuit for lift control is as follows. Under startup silicon controlled rectifier 1312 ("SCR 1312") is off. When the operator signals the lift solenoid for movement with lift control input line 1306, power is supplied through normally closed relay 1320 to the lift solenoid. When a default loading position or other predetermined lift position is reached, lift switch 1304 may close and create a short pulse of current to the gate of SCR 1312, turning SCR 1312 on and allowing it to conduct current from the anode to the cathode. Once turned on, SCR 1312 is latched so that as long as power is supplied from lift control input line 1306, SCR will remain on. An on state of SCR 1312 energizes solenoid 1316 which will pull in normally-closed relay 1320 and the lift cylinder will not operate as power to its valve via lift cylinder output line 1307 will be removed. When power is removed from lift control input line 1306 by the operator, SCR 1312 will unlatch (i.e., enter an "off" state and restricting current flow from the anode to the cathode), solenoid 1316 will de-energize, and normally-closed relay 1320 will again close allowing the operator to operate lift solenoid 1307 via lift control input 1306. The operator may move the lift to a negative position, as the SCR will not latch again (i.e., breaking the circuit between lift input and output) until the lift switch input 1304 is opened and closed again. Lift switch input 1304 may reset (i.e., cause to be opened) via any number of mechanisms (e.g., a manual reset button, a time-based reset, a sensed position-based reset, etc.). According to an exemplary embodiment, a sensor is positioned such that it is triggered "switch closed" whenever the lift is in a negative lift range and opens or reopens whenever the lift moves to a positive lift range.

Referring further to FIG. 13, an exemplary operation of the circuit for tilt control is as follows. Under startup silicon controlled rectifier 1314 ("SCR 1314") is off. When the operator signals the tilt cylinder for movement with tilt control input line 1310, power is supplied through normally closed relay 1322 to the tilt cylinder. When a default loading position or other predetermined tilt position is reached, tilt switch 1308 may close and create a short pulse of current to the gate of SCR 1314, turning SCR 1314 on and allowing it to conduct current from the anode to the cathode. Once turned on, SCR 1314 is latched so that as long as power is supplied from tilt control input line 1310, SCR 1314 will remain on. An "on" state of SCR 1314 energizes solenoid 1318 which will pull in normally-closed relay 1322 and the tilt cylinder will not operate as power to its valve via tilt cylinder output line 1311 will be removed. When power is removed from tilt control input line 1310 by the operator, SCR 1314 will unlatch (i.e., enter an "off" state, restricting current flow from the anode to the cathode), solenoid 1318 will de-energize, and normally-closed relay 1322 will again close allowing the operator to continue operation of tilt solenoid 1307 via tilt control input 1310. The operator may move the boom to a negative tilt position, as SCR 1314 will not latch again (i.e., breaking the circuit between tilt input 1310 and output 1111) until the tilt switch input 1308 is opened and closed again. Tilt switch input 1308 may reset (i.e., cause to be opened) via any number of mechanisms (e.g., a manual reset button, a time-based reset, a sensed position-based reset, etc.). According to an exemplary embodiment, a sensor is positioned such that it is triggered (i.e., the switch is closed) whenever the boom is in a negative tilt range and opens or reopens whenever the tilt moves to a positive tilt range.

Referring to FIGS. 14A-14F a series of schematics is shown, according to an alternative cylinder control circuit. The controller switch is the operator controlled switch. Solenoid function is the lift or tilt cylinder output. Position switch is the position sensor or position switch. In a free state, power is not supplied to the circuit (FIG. 14A). When voltage is supplied, the circuit is in a ready state (FIG. 14B). Inductor k1 is not energized and its associated relays are in their normal states. Inductor k2 is energized and its associated relays are in their latched state. The controller may directly operate the solenoid function (FIG. 14C). When a position is reached so that the position switch is closed, inductor k1 is energized and its associated relays are latched, breaking controller switch control of the solenoid function (FIG. 14D). The circuit will stay in this state (FIG. 14D), where the solenoid will not move until the controller switch is released (FIG. 14E). When the controller switch is released, inductor k2 is released and de-energized, causing its associated relays to move back to their normal states. The circuit between the controller switch and the solenoid function is reclosed when k2 is released so that when the controller switch is activated (FIG. 14F), the controller switch signal will again actuate solenoid function, allowing the tilt or lift cylinders to continue operation in a negative tilt or lift range.

According to any preferred embodiment, a wrecker with an underlift motion control system is provided. The control system will automatically stop the motion of the boom lift and tilt down functions when a predetermined position is detected. This activity allows a vehicle engaging structure (wheel engagement mechanism, grid system) attached to the underlift boom to be lowered to a predetermined position (level and close to the ground) before permitting further tilting or lowering of the boom below the predetermined level. The figures generally show the wrecker boom and underlift components as well as several sensor installations configured to determine the position of the boom and underlift. Several methods and circuits for controlling the electrical signal to the control valve of tilt or lift cylinders are also provided.

According to yet other exemplary embodiments, an underlift system may position the boom and vehicle engaging mechanism as close to the ground as possible. For example, the underlift mechanism may be configured to provide about 1" to 2" of default ground clearance. Other embodiments may include greater or less clearance distance between boom structures and the ground. According yet other exemplary embodiments, the predetermined or default loading position may be configured via user preference. An operator control panel may be provided with a button, slide, or other control mechanism to allow the driver to store a preferred default loading position in memory or otherwise store information or settings related to the position. It is also important to note that position sensors could be configured to sense the ground or distance from the ground rather than sensing or detecting information regarding the structures of the underlift. The position sensors could be ground sensors, switches that close or open when touching the ground, ultrasonic sensors, proximity sensors, capacitive sensors, optical sensors, ground contour sensors, radar type sensors, pulse radar sensors, laser distance sensors, and/or any other position sensor of the past, present, or future that may be used to detect ground and/or underlift proximity/position.

It is also important to note that the system may provide a truck operator with audio and/or visual information or indication when the default or predetermined loading angle has been reached. For example, the control system could be configured to cause a speaker to buzz or beep when the predetermined position is reached. According to other embodiments, a light (e.g., LED) might blink or enable when the predetermined position (or any other position) is reached. Cameras may also be used with a display screen to allow the operator to see the movement and/or proximity or position of the underlift.

According to other various embodiments, actuators other than hydraulic cylinders are used to lift the underlift boom and/or vehicle engaging mechanism of the underlift. For example, the underlift movement actuators of the vehicle may be wire rope type actuators, linear actuators, racket and pinion actuators, hydraulic motors and gear systems, rotary actuators, air bladder or bag lift systems, and/or any other type of mechanical actuation device that may be used by an underlift control system to controllably position and move underlift structures (e.g., boom, vehicle engaging device, etc.).

It is important to note that the underlift control systems herein disclosed could be underlift control systems of any tow truck having an underlift mechanism. For example, the underlift control systems of various embodiments could be installed in light duty, standard duty, heavy duty, industrial grade, and/or any other grade of tow truck.

A vehicle includes a chassis and an underlift supported by the chassis. The underlift includes a boom including a vehicle engaging device coupled to the boom and a movement actuator for moving the boom. The underlift further includes a control system configured to restrict actuation of the movement actuator when the boom moves to a predetermined position; and an operator control coupled to the control system that allows the operator to control the movement actuator after actuation of the movement actuator has been restricted.

One embodiment of the invention relates to a vehicle. The vehicle includes a chassis and an underlift supported by the chassis. The underlift includes a boom and a vehicle engaging device coupled to the boom. The underlift also includes a tilt cylinder for rotating the boom in at least a downward direction. The vehicle further includes a tilt position sensor configured to detect a predetermined loading angle of the boom. A control system is configured to restrict actuation of the tilt cylinder when the predetermined loading angle is detected by the tilt position sensor. An operator control coupled to the control system allows the operator to selectively actuate the tilt cylinder for rotating the boom in the downward direction after the predetermined loading angle is detected.

Another embodiment of the invention relates to a method for controlling the movement of a vehicle underlift boom. The method includes sending an actuating signal from an operator control to a cylinder configured to move the boom to different boom positions, wherein the boom moves in response to the signal. The method further includes sensing the boom position and disrupting the actuating signal sent to the cylinder when a predetermined boom position has been sensed. The method further includes receiving input from the operator control to resume movement; and resuming the sending of the actuating signal to the cylinder so that the boom continues movement in response to the actuating signal.

Another embodiment of the invention relates to a vehicle having an underlift. The underlift includes means for providing an operator with selective control of underlift position movement and means for restricting the underlift movement when the underlift has moved to a predetermined position. The vehicle further includes an underlift control circuit configured to allow the operator to continue movement of the underlift.

Another embodiment of the invention relates to an underlift control circuit. The underlift control circuit includes an underlift output, the underlift output being configured to communicate an underlift actuating signal from an operator input to an underlift tilt or lift mechanism. The underlift control circuit further includes a relay configured to complete or break the communicative circuit between the operator input and the underlift output; and a silicon controlled rectifier configured to latch the relay in a circuit breaking state when the gate of the silicon controller rectifier is pulsed by an underlift position circuit, the underlift position circuit pulsing when a default loading position has been reached. The silicon controlled rectifier and relay are configured to remain latched in the circuit breaking state until an operator discontinues the underlift actuating signal coming from the operator input.

It is also important to note that the circuits and block diagrams shown in the figures are of varying complexity and elements may have been omitted for simplicity and clarity. For example, one skilled in the art will appreciate that various filtering, grounding, power supplying, and/or other component parts or additional circuits may be added to the innovative features described herein when implementing the circuits in various vehicles.

Furthermore, the methods described in the method claims may be implemented using any number of computer processing or other programmable processing components. Additionally, various alternative digital and/or analog logic or circuit or memory components may be used as alternatives to the components shown in the circuits described herein and still fall within the scope of various embodiments described and claimed herein.

The construction and arrangement of the elements of the underlift system as shown in the illustrated and other exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein. For example, elements shown as integrally formed may be constructed of multiple parts or elements, the position of elements may be reversed or otherwise varied, and the nature or number of discrete elements or positions may be altered or varied. It should be noted that the elements and/or assemblies of the seating system may be constructed from any of a wide variety of materials that provide sufficient strength or durability in any of a wide variety of colors, combinations and suitable materials. Other substitutions, modifications, changes and omissions may be made in the design, operating conditions and arrangement of the preferred and other exemplary embodiments without departing from the scope of the present inventions.

The present application contemplates methods, systems and program products on any machine-readable media for accomplishing its operations. The embodiments of the present application may be implemented using an existing computer processors, or by a special purpose computer processor for an appropriate system, incorporated for this or another purpose or by a hardwired system.

It should be noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps. Any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the present inventions as expressed herein.

What is claimed is:

1. A vehicle comprising:
   a chassis;

an underlift supported by the chassis, the underlift comprising:
  a boom including a vehicle engaging device coupled to the boom; and
  a movement actuator for moving the boom;
a control system configured to restrict actuation of the movement actuator when the boom moves to a predetermined position;
an operator control coupled to the control system that allows the operator to control the movement actuator after actuation of the movement actuator has been restricted; and
a position sensor that is a switch that breaks a movement actuating circuit between the operator control and the movement actuator,
wherein the control system is configured to wait until the operator has released an operator control that was causing a downward motion before allowing the operator to then signal the movement actuator to actuate further downward.

2. The vehicle of claim 1, wherein the movement actuator rotates the boom about a pivot.

3. The vehicle of claim 1, wherein the vehicle further comprises an operator bypass switch that recompletes the actuating circuit.

4. The vehicle of claim 1, wherein the vehicle engaging device and movement actuator are generally located at opposite ends of the boom.

5. The vehicle of claim 1, wherein the movement actuator is a hydraulic cylinder.

6. The vehicle of claim 1, wherein the movement actuator rotates the boom about a pivot in at least a downward direction.

7. The vehicle of claim 1, further comprising a position sensor configured to detect a predetermined loading height of the boom.

8. The vehicle of claim 1, wherein the control system comprises a time delay relay configured to restrict an actuating signal sent to the movement actuator when the predetermined position is reached.

9. The vehicle of claim 4, the underlift further comprising a position sensor to detect a predetermined loading position of the boom.

10. The vehicle of claim 7, wherein the control system is further configured to restrict actuation of the movement actuator when the predetermined loading height is detected by the position sensor; and the control system allows the operator to actuate the movement actuator after the predetermined loading height is detected so that the boom may continue movement in a downward direction.

11. The vehicle of claim 8, the underlift further comprising a position sensor to detect a predetermined loading position of the boom.

12. A vehicle comprising:
  a chassis;
  an underlift supported by the chassis, the underlift comprising:
    a boom including a vehicle engaging device coupled to the boom; and
    a movement actuator for moving the boom;
  a control system configured to restrict actuation of the movement actuator when the boom moves to a predetermined position;
  an operator control coupled to the control system that allows the operator to control the movement actuator after actuation of the movement actuator has been restricted; and
  a position sensor that is a switch that breaks a movement actuating circuit between the operator control and the movement actuator,
  wherein the position sensor is a switch that resets when the boom has moved back to or above the predetermined position from a position below the predetermined location.

13. The vehicle of claim 12, wherein the vehicle engaging device and movement actuator are generally located at opposite ends of the boom.

14. The vehicle of claim 12, wherein the movement actuator is a hydraulic cylinder.

15. The vehicle of claim 12, wherein the movement actuator rotates the boom about a pivot in at least a downward direction.

16. The vehicle of claim 12, further comprising a position sensor configured to detect a predetermined loading height of the boom.

17. The vehicle of claim 16, wherein the control system is further configured to restrict actuation of the movement actuator when the predetermined loading height is detected by the position sensor; and the control system allows the operator to actuate the movement actuator after the predetermined loading height is detected so that the boom may continue movement in a downward direction.

18. The vehicle of claim 12, wherein the control system comprises a time delay relay configured to restrict an actuating signal sent to the movement actuator when the predetermined position is reached.

19. The vehicle of claim 12 wherein the movement actuator rotates the boom about a pivot.

20. The vehicle of claim 12 wherein the vehicle further comprises an operator bypass switch that recompletes the actuating circuit.

* * * * *